I. H. Coller.
Harvester Pitman.
Nº 48,658. Patented Jul. 11, 1865.

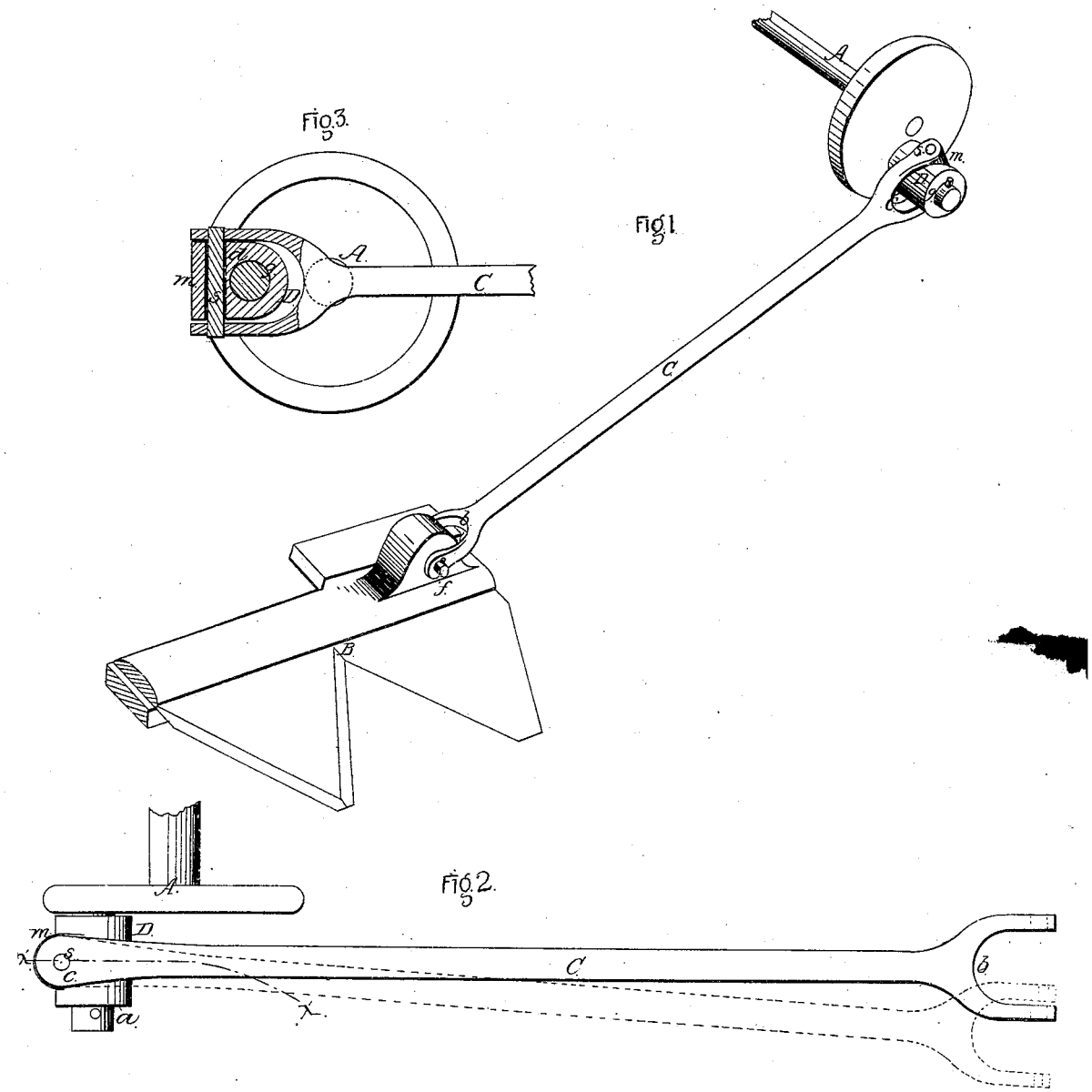

Witnesses:

Inventor:

UNITED STATES PATENT OFFICE.

ISAAC H. COLLER, OF POUGHKEEPSIE, NEW YORK.

IMPROVEMENT IN HARVESTING-MACHINES.

Specification forming part of Letters Patent No. 48,658, dated July 11, 1865.

*To all whom it may concern:*

Be it known that I, ISAAC H. COLLER, of Poughkeepsie, in the county of Dutchess and State of New York, have invented a new and useful Improvement in Pitman-Connections of Reaping and Mowing Machines; and I do hereby declare that the following is a full, clear, and exact description of the same, reference being had to the accompanying drawings, forming part of this specification, in which—

Figure 4:
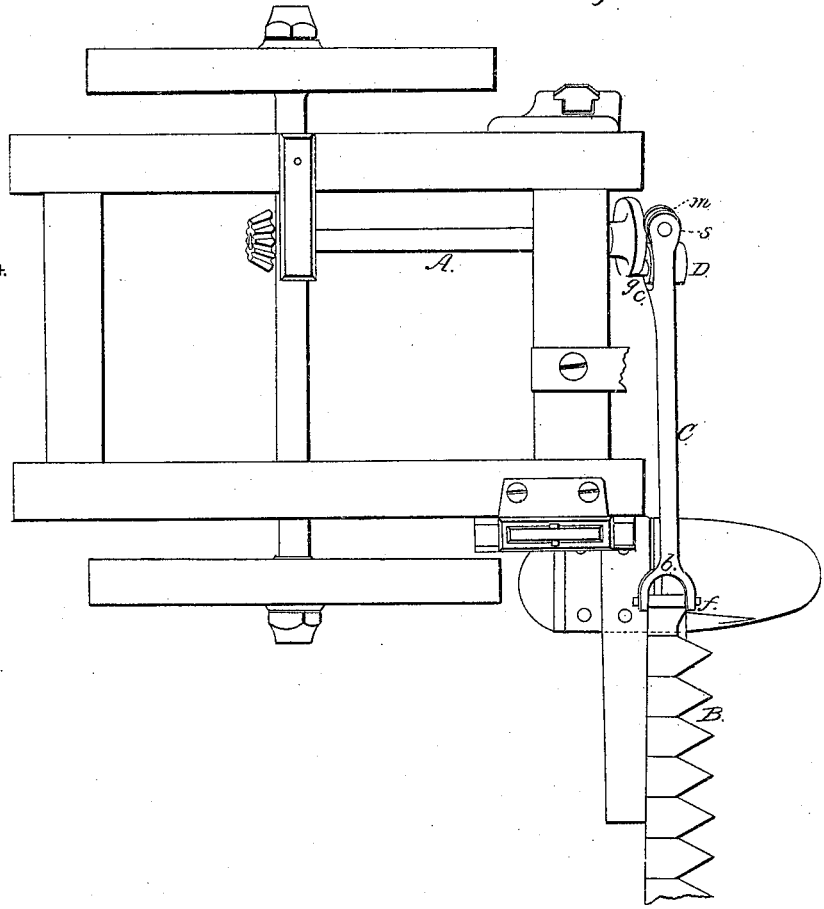
Figure 5:
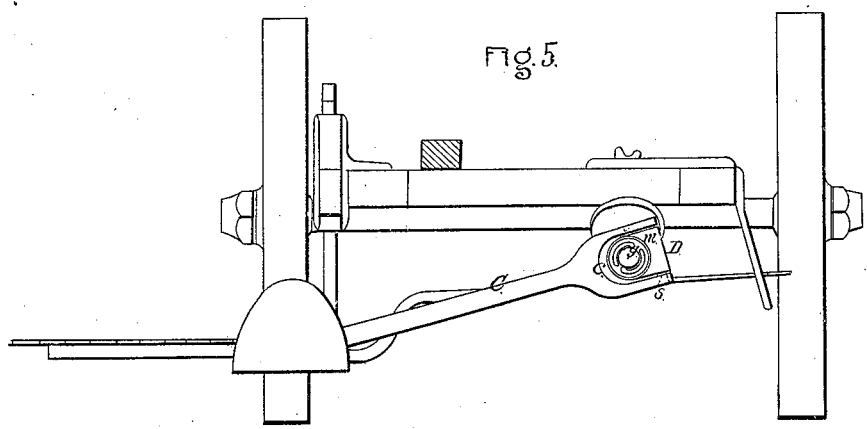

Figure 1 is a perspective view of my invention, as applied for the purpose intended. Fig. 2 is a top view of my invention disconnected from the cutter-bar of a harvester. Fig. 3 is vertical section in the line $x\ x$ of Fig. 2. Fig. 4 is a plan or top view of a harvester with my invention applied to it. Fig. 5 is a front view of the same.

The same letters of reference in the several figures indicate corresponding parts.

In the practical operation of reaping and mowing machines it is found that considerable friction is induced at the point where the pitman-rod of the cutter-bar connects with the crank-pin of the driving-shaft. This is due to a deflection of the cutting device out of a plane with the pitman-rod, such a deflection being produced by the resistance of the standing grain as the harvester moves forward. This friction I propose to obviate, and still use the simple and almost universally adopted pitman contrivance, without increasing materially the cost thereof.

The nature of my invention consists in the application, between the harvester-sickle and the crank or eccentric of the pitman-shaft, of a sleeve which has an auxiliary box at right angles and exterior to its bore formed on it, for the connecting-pin of the harvester-pitman to pass entirely through and work in.

To enable others skilled in the art to make and use my contrivance, I will describe the same with reference to the drawings.

I have shown the pitman-shaft in Figs. 1, 2, and 3, as being arranged horizontally; but it is obvious that it can be placed in a vertical position if the heel of the sickle-rod is perforated vertically, or without this change if the forks on both ends of the rod are in the same plane.

A is the eccentric or crank shaft which drives the sickle. It is shown applied on the gear or main frame of a harvester in the usual manner. The wrist-pin $a$ of this device A is made longer than usual.

B is the sickle or cutting device.

C is the pitman-rod. Its inner end, $b$, is forked; so, also, is its outer end, $c$. The latter forked end is formed by cutting out the metal horizontally, the former by cutting it out vertically. The prongs of one fork, therefore, are at right angles to those of the other. The fork $b$ straddles the heel of the sickle-rod, and is confined by a pivot, $f$.

D is the sleeve, which fits loosely on the wrist-pin. This sleeve is cast with a vertical bore, $d$, and therefore is enlarged near the middle of its length and exterior to its bore $g$, as represented at $m$. By thus enlarging the sleeve the bore $d$ can be entirely through the sleeve, and there will be sufficient strength in the sleeve to support the strain that may come upon it at any point.

It is essential to use a through-pin, $s$, for connecting the pitman-rod to the sleeve, as this pin has to bear much strain. By using a pin that passes entirely through the enlarged part of the sleeve I am enabled to make the pin of wrought-metal, and very firmly secure it in place. If two small cast pivots or even wrought pivots were used centrally over and under the bore $g$ of the sleeve, they would either break off or soon become rickety. The connection at this point must be strong and durable, and hence I adopt the plan of construction designated by the letters $d\ m$. When the sleeve D is fitted on the wrist-pin $a$ the fork $c$ is made to straddle it, and the through-pin $s$ is inserted, as represented in Fig. 3.

Keys may be passed through the ends of the pin $s$, or the ends may be riveted upon the prongs of the fork $c$.

By examining Fig. 2 of the drawings, it will be seen that the pivotal connection $s$ allows the pitman at its inner end to move backward, as illustrated in red, in case the cutting device is deflected by the standing grain.

It will also be evident that the pitman has freedom, as usual, to turn on the wrist-pin $a$ of the crank-shaft A whenever the cutting apparatus rises or falls, or while the crank is making its circuit.

The idea of a double-acting joint in this connection may not be new, irrespective of construction, arrangement, and operation. Therefore I do not claim such a joint *per se*; but—

What I do claim as my invention, and desire to secure by Letters Patent, is—

The application of the sleeve D *m*, with the crank-shaft A, pitman C, and sickle B, to harvesting-machines, substantially as and for the purpose herein described.

ISAAC H. COLLER.

Witnesses:
 R. T. CAMPBELL,
 E. SCHAFER.